(12) United States Patent
Lemmons

(10) Patent No.: US 11,848,845 B2
(45) Date of Patent: *Dec. 19, 2023

(54) CONTENT DELIVERY NETWORK SERVER TESTING

(71) Applicant: Comcast Cable Communications, LLC, Philadelphia, PA (US)

(72) Inventor: Chris Lemmons, Henderson, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/734,783

(22) Filed: May 2, 2022

(65) Prior Publication Data

US 2023/0083553 A1    Mar. 16, 2023

Related U.S. Application Data

(63) Continuation of application No. 17/097,782, filed on Nov. 13, 2020, now Pat. No. 11,349,737, which is a continuation of application No. 15/989,419, filed on May 25, 2018, now Pat. No. 10,873,516.

(51) Int. Cl.
*H04L 43/0852* (2022.01)
*H04L 43/16* (2022.01)
*H04L 43/50* (2022.01)
*H04L 67/10* (2022.01)

(52) U.S. Cl.
CPC .......... *H04L 43/0852* (2013.01); *H04L 43/16* (2013.01); *H04L 43/50* (2013.01); *H04L 67/10* (2013.01)

(58) Field of Classification Search
CPC ..... H04L 43/0852; H04L 43/16; H04L 43/50; H04L 67/10
See application file for complete search history.

(56) References Cited

U.S. PATENT DOCUMENTS

| | | | |
|---|---|---|---|
| 7,454,457 B1* | 11/2008 | Lowery | H04L 47/10 709/224 |
| 2005/0102318 A1* | 5/2005 | Odhner | G06F 11/3457 714/E11.193 |
| 2015/0331917 A1* | 11/2015 | Shimizu | G06F 11/3414 707/602 |
| 2016/0099854 A1* | 4/2016 | Swaminathan | H04N 21/4826 709/224 |
| 2016/0164761 A1* | 6/2016 | Sathyanarayana | H04L 41/046 709/219 |
| 2017/0286277 A1* | 10/2017 | Lau | G06F 11/3447 |
| 2019/0190971 A1* | 6/2019 | Chen | H04L 65/75 |
| 2020/0175056 A1* | 6/2020 | Fox | A61B 5/4848 |
| 2020/0275160 A1* | 8/2020 | Spikes | H04L 67/34 |
| 2021/0143982 A1* | 5/2021 | Shah | G09B 5/12 |

* cited by examiner

*Primary Examiner* — Quang N Nguyen
(74) *Attorney, Agent, or Firm* — Banner & Witcoff, Ltd.

(57) ABSTRACT

Described herein is a system and method for testing a computing device, such as a server, to minimize network impact. A computing device that is new or needs to be evaluated, such as an edge server, in a content delivery network may be determined and a sibling edge server which shares a common characteristic with the edge server may be selected. Requests received on the sibling edge server may be collected and filtered to determine a subset of the requests. The subset of the requests are transmitted to the edge server for processing and evaluation.

20 Claims, 5 Drawing Sheets

CONTENT DELIVERY NETWORK SERVER TESTING

CROSS-REFERENCE TO RELATED APPLICATIONS

This application is a continuation of U.S. application Ser. No. 17/097,782 filed on Nov. 13, 2020, which is a continuation of U.S. application Ser. No. 15/989,419 filed May 25, 2018 (now U.S. Pat. No. 10,873,516), which are hereby incorporated herein by reference in their entirety.

BACKGROUND

A content delivery network (CDN) may serve a variety of content, including media files such as video or audio files, from a single content provider origin server and to millions of destinations where content consumers reside. A CDN may be a hierarchy of servers having a few upper-tier servers near the content provider and many lower-tier edge servers sitting close to end users. Client requests for content may be received at the edge servers, and then propagated up through the hierarchy of the CDN to find a server that has a copy of the requested content. However, installing and testing these CDN servers can present a challenge.

SUMMARY

The following summary is for illustrative purposes only, and is not intended to limit or constrain the detailed description. The following summary merely presents various described aspects in a simplified form as a prelude to the more detailed description provided below.

For a new edge server installed in the CDN topology, a test tool may determine a sibling edge server that has a common parent mid-tier server with the new edge server. The test tool may monitor real time user requests received by the sibling server, and send copies of these user requests to the new edge server for the new edge server to also handle, to mimic the real time load on the new edge server. The new edge server may seek to obtain the requested content from the parent mid-tier server. However, to help minimize traffic on the CDN, the test tool may introduce a delay in sending the copied requests to the new edge server, to allow time for the sibling edge server to first send its request (if needed) to the parent mid-tier server. This may minimize the need for the parent mid-tier server to send a request further upstream in the CDN, because it may well have already done so in response to the sibling's request. The delay is a parameter that may be tuned to control the relative timing of requests at the parent server and/or above, and in view of any expiration windows applicable to the sibling server. As such, the test tool tests the performance of the new edge server using the real time load of the sibling server while reducing the risk of flooding the origin server.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Various features of the methods and systems for tracking individual and aggregated viewership statistics for predictive purposes will be further described below. However, first an exemplary operating environment as shown in FIGS. 1 and 2 will be described.

Figure 1:
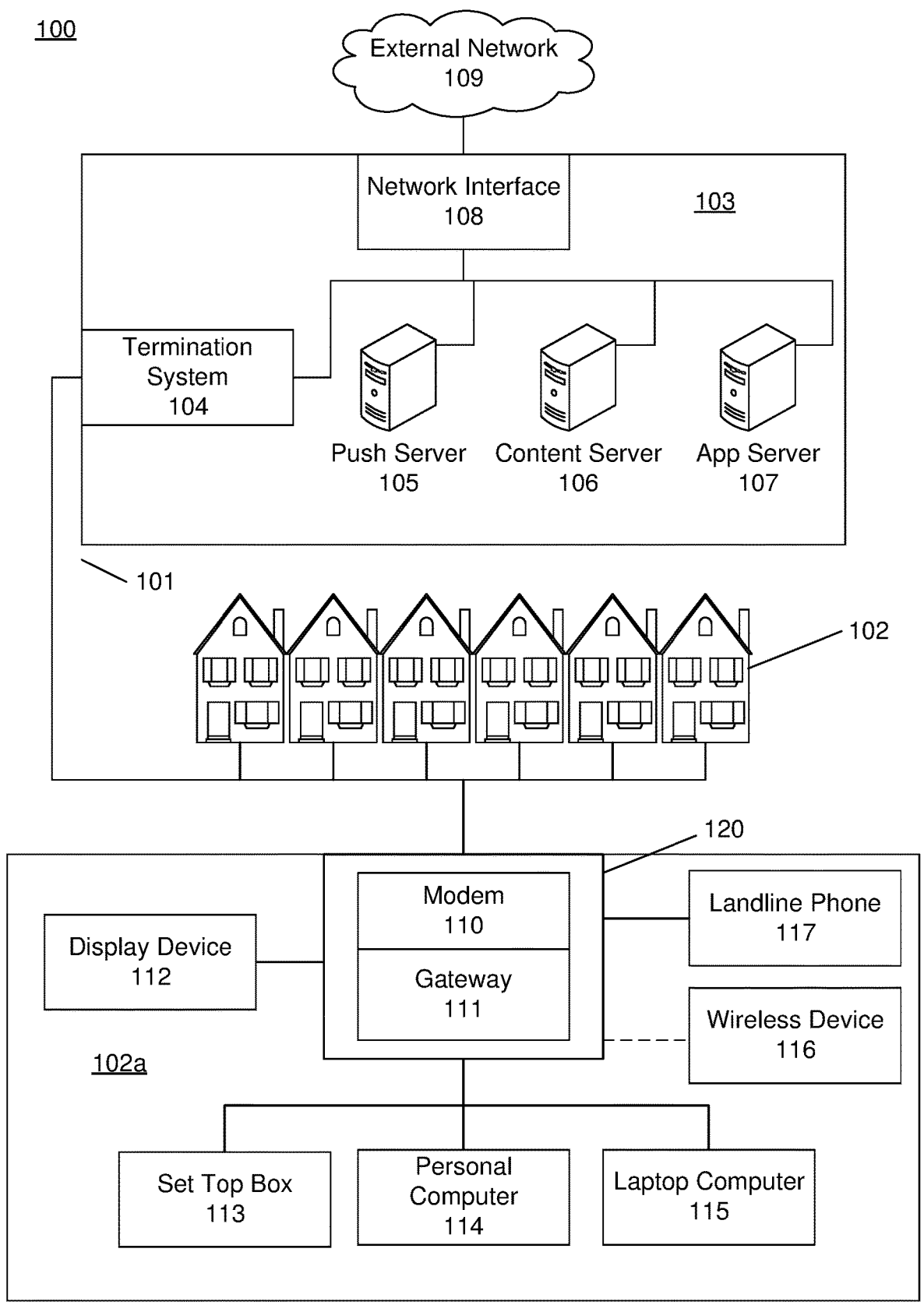
FIG. 1 illustrates an example information access and distribution network.
Figure 2:
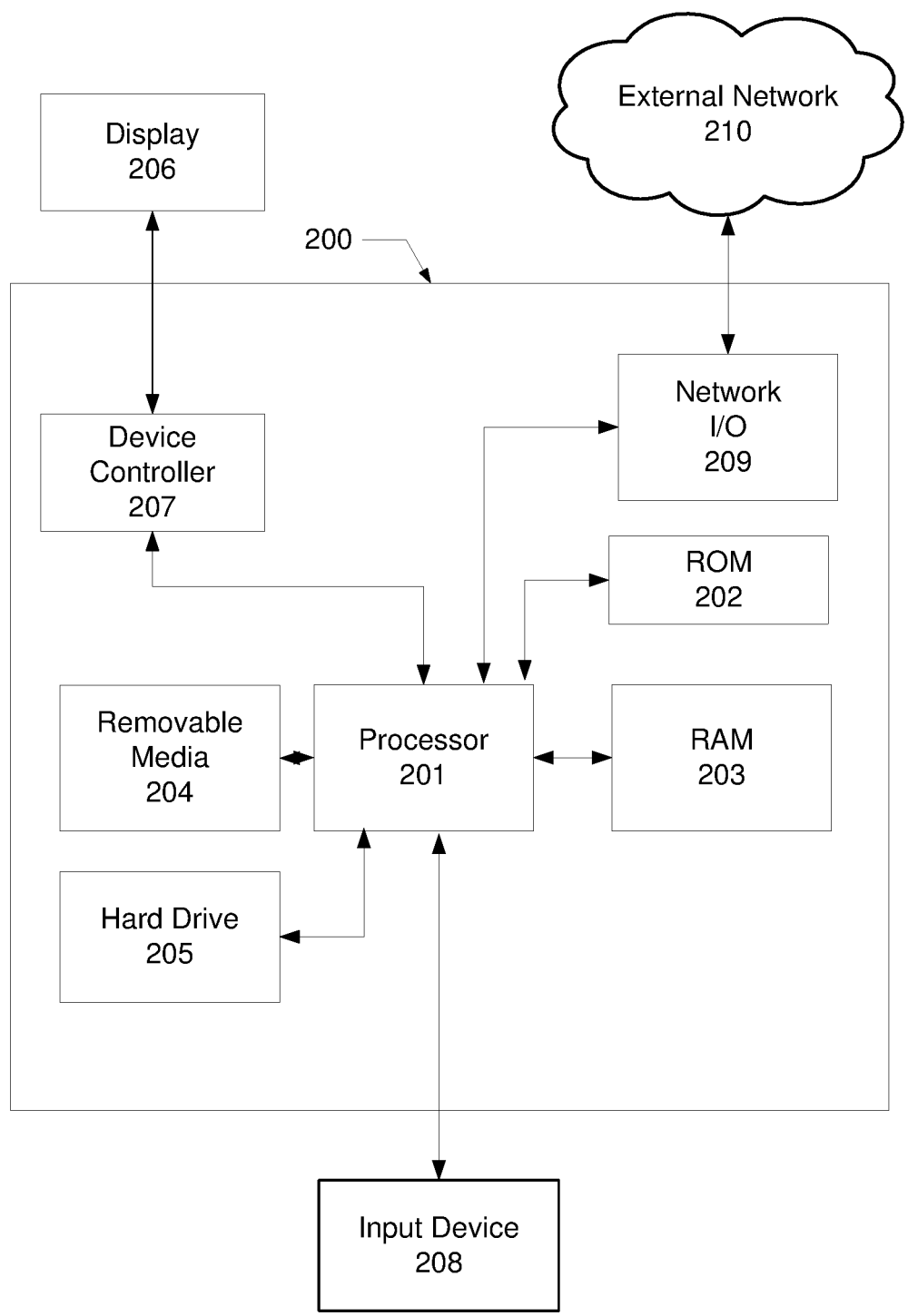
FIG. 2 illustrates an example hardware and software platform on which various elements described herein can be implemented.

FIG. 1 illustrates an example information access and distribution network 100 on which many of the various features described herein may be implemented. The network 100 may be any type of information distribution network, such as satellite, telephone, cellular, wireless, etc. One example may be an optical fiber network, a coaxial cable network or a hybrid fiber/coax (HFC) distribution network. Such networks 100 use a series of interconnected communication links 101 (e.g., coaxial cables, optical fibers, wireless connections, etc.) to connect multiple premises, such as locations 102 (e.g., homes, businesses, institutions, etc.), to a local office 103 (e.g., a central office or headend). The local office 103 may transmit downstream information signals onto the links 101, and each location 102 may have a receiver used to receive and process those signals.

There may be one link 101 originating from the local office 103, and it may be split a number of times to distribute the signal to various locations 102 (e.g., a premises, a home, building, etc.) in the vicinity (which may be many miles) of the local office 103. Although the term home is used by way of example, locations 102 may be any type of user premises, such as businesses, institutions, etc. The links 101 may include components not illustrated, such as splitters, filters, amplifiers, etc. to help convey the signal clearly. Portions of the links 101 may also be implemented with fiber-optic cable, while other portions may be implemented with coaxial cable, other links, or wireless communication paths.

The local office 103 may include an interface 104, which may be a termination system (TS), such as a cable modem termination system (CMTS), which may be a computing device configured to manage communications between devices on the network of links 101 and backend devices such as servers 105-107 (to be discussed further below). The interface 104 may be as specified in a standard, such as, in an example of an HFC-type network, the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream channels or frequencies to be received by devices, such as modems at the various locations 102, and to receive upstream communications from those modems on one or more upstream frequencies. The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the network 109, and to other devices on the network such as a cellular telephone network and its corresponding cell phones (e.g., cell phone 117).

As noted above, the local office 103 may include a variety of servers 105-107 that may be configured to perform various functions. For example, the local office 103 may include one or more push notification servers 105. A push notification server 105 may generate push notifications to deliver data and/or commands to the various locations 102 in the network (or more specifically, to the devices in the locations 102 that are configured to detect such notifications). The local office 103 may also include one or more data servers 106. A data server 106 may be one or more computing devices that are configured to provide data to users in the homes. This data may be, for example, video on demand movies, television programs, songs, text listings, etc. The data server 106 may include software to validate user identities and entitlements, locate and retrieve requested data, encrypt the data, and initiate delivery (e.g., streaming) of the data to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting data such as television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the locations 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example location 102a may include an interface 120. The interface 120 can include any communication circuitry needed to allow a device to communicate on one or more links 101 with other devices in the network 100. The interface 120 may comprise a device 110, such as a modem, which may include transmitters and receivers used to communicate on the links 101 and with the local office 103. The device 110 may be, for example, a coaxial cable modem (for coaxial cable links 101), a fiber interface node (for fiber optic links 101), or any other desired modem device. The device 110 may be connected to, or be a part of, a gateway 111 (e.g., a gateway interface device). The gateway 111 may be a computing device that communicates with the device 110 to allow one or more other devices in the home to communicate with the local office 103 and other devices beyond the local office. The gateway 111 may be a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Having described an example communication network shown in FIG. 1 in which various features described herein may be implemented, an example computing device as shown in FIG. 2 will be described.

FIG. 2 illustrates general hardware and software elements that can be used to implement any of the various computing devices (e.g., network devices, terminal devices, remote control devices, etc.) discussed herein. The computing device 200 may include one or more processors 201, which may execute instructions of a computer program to perform any of the features described herein. The instructions may be stored in any type of computer-readable medium or memory (e.g., a non-transitory computer-readable medium or memory), to configure the operation of the processor 201. For example, instructions may be stored in a read-only memory (ROM) 202, random access memory (RAM) 203, hard drive, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc.

The computing device 200 may also include one or more network interfaces 209, such as input/output circuits (such as a network card) to communicate with an external network 210. The interface 209 may be a wired interface, wireless interface, or a combination of the two. In some embodiments, the interface 209 may include a modem (e.g., a cable modem), and the network 210 may include the communication links 101 discussed above, the external network 109, an in-home network, a provider's wireless, coaxial, fiber, or hybrid fiber/coaxial distribution system (e.g., a DOCSIS network), or any other desired network. The computing device 200 may communicate with the external networks 210 or other devices using one or more communication protocols, such as wired communication protocols and wireless communication protocols (e.g., Wi-Fi, Bluetooth, Zig-Bee, Z-Wave, etc.).

The FIG. 2 example is a hardware configuration, although the illustrated components may be wholly or partially implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

Figure 3:
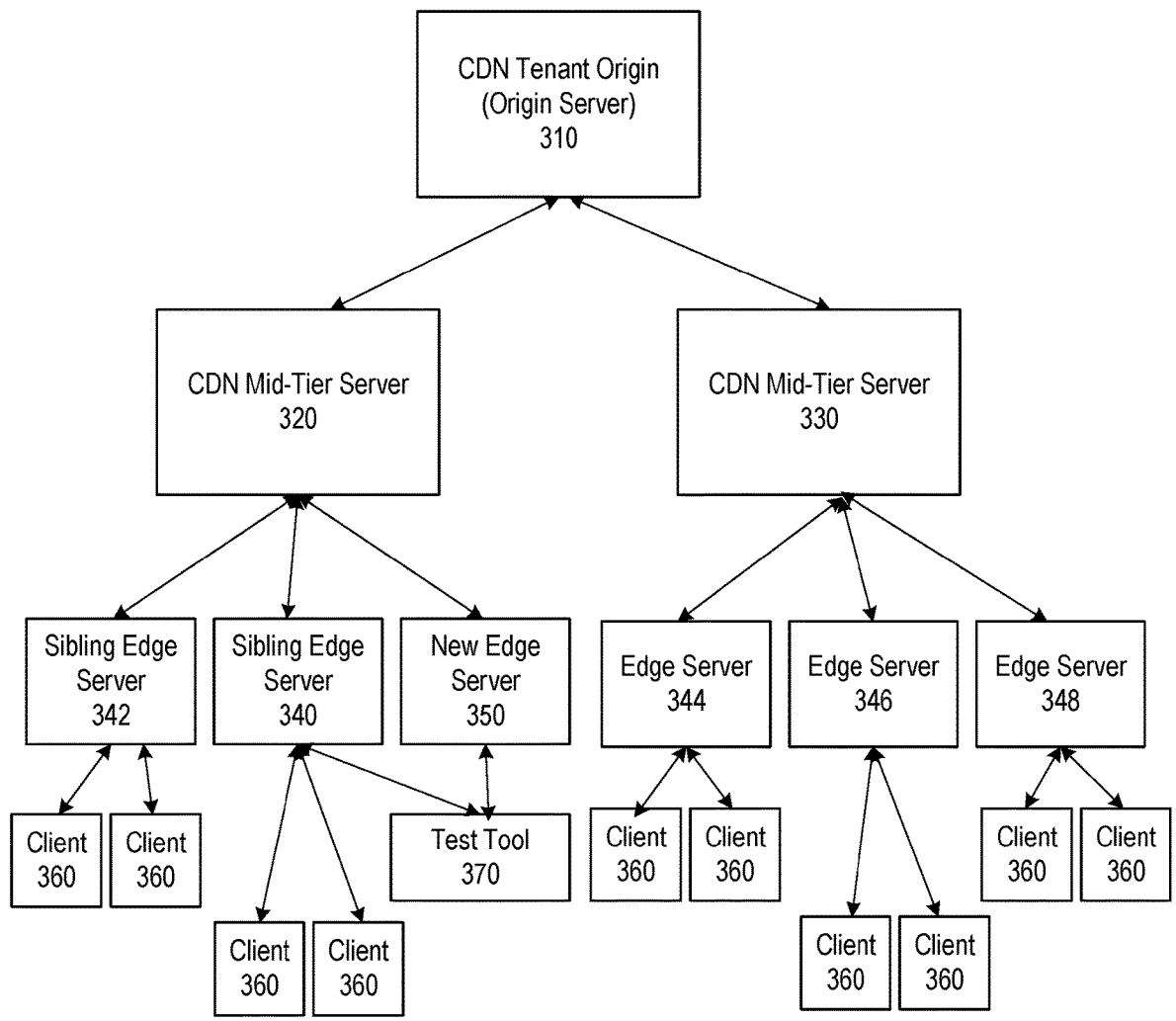
FIG. 3 illustrates an example schematic block diagram for a content delivery network in accordance with aspects disclosed herein.

FIG. 3 illustrates an example schematic block diagram for a content delivery network in accordance with aspects disclosed herein. Referring to FIG. 3, system 300 may include Content Delivery Network (CDN) Tenant Origin ("origin server") 310, CDN mid-tier servers 320 and 330, edge servers 340-350, clients 360 and test tool 370. Origin server 310, CDN mid-tier servers 320 and 330, edge servers 340-350, clients 360 and test tool 370 may include one or more physical components, such as one or more processors, memories, communication interfaces, and/or the like.

A CDN may be a geographically distributed network of proxy servers, including the mid-tier servers, the edge servers and their data centers, to distribute service spatially relative to end-users to provide high availability and high performance. A CDN may serve a large portion of content, including web objects (text, graphics and scripts), downloadable objects (media files, software, documents), applications (e-commerce, portals), live streaming media, on-demand streaming media, social networks and other internet content. Content owners such as media companies and e-commerce vendors use the CDN to deliver their content to their end users. A CDN may include one more origin servers 310, which are computing devices that contain original versions of content originated from content owners. For example, origin server 310 may contain the initial copy of an online video that is uploaded by a user of a social media site and may reside at the highest level of caching hierarchy in the CDN topology. The CDN arrangement may be a logical hierarchy for different content. For example, server 310 may be the origin server with respect to one uploaded video, with server 320 acting as a mid-tier server for that video, but for a different video the roles may be changed. Server 320 may act as an origin server for that different video, and server 310 may act as a mid-tier server for that different video. Accordingly, there may be multiple different CDN hierarchies applied to a common set of computer servers.

CDN may include one or more proxy servers such as CDN mid-tier servers 320 and 330, and edge servers 340-350. The hierarchy of servers may store copies of various content assets, and if an incoming request asks for a content asset that is not already stored in the server, then that server may request the content asset from a higher-level server in the hierarchy. Each server may manage its own storage, and may discard copies of content that it decides it does not need to keep. The proxy servers may redirect requests from requesting clients to origin servers and cache the results. In the CDN context, the proxy servers may obtain content using HTTP from an origin server on behalf of a requesting client. The proxy server may further cache the content on the proxy servers so it can be reused when other requesting clients request the same content.

Mid-tier servers 320 and 330 reside at a level below origin server 310 in the caching hierarchy. Mid-tier servers 320 and 330 may communicate with origin server 310 using HTTP protocol and host cached versions of the content obtained from origin server 310. In turn, mid-tier servers 320 and 330 may communicate with edge servers 340-350 and serve the requests from edge servers 340-350. After receiving a request for a piece of content from edge servers 340-350, mid-tier servers 320 and 330 may check if they already contain a cached version of the content. If not, mid-tier servers 320 and 330 may request the content from origin server 310, forward the content to edge servers 340-350, and save a cached version of the content on mid-tier servers 320 and 330.

Mid-tier servers 320 and 330 may act on behalf of the requesting clients (e.g. edge servers 340-48) and may, in turn, provide copies of the video to lower-tier servers like edge server 340 as needed. In this way, the content from the origin server 310 may be disseminated among a variety of servers (e.g., all around the country), without requiring origin server 310 to handle every request. Origin server 310 may not aware of mid-tier servers 320 and 330, and the requesting clients may request the proxy servers to retrieve content from a particular origin server. In such a proxy scenario, the requesting clients may be configured to use the proxy's IP address and port. The requesting clients may connect to the proxy server for content. The content provider may not have to change the URL the requesting clients use for the content, and as a result may be unaware of the existence of the proxy server in the middle of a transaction.

Edge servers 340-350 reside at a level below mid-tier servers 320 and 330 in the caching hierarchy, and they locate at the edges of a network closest to clients 360 or end-users. Edge servers 340-348 communicate with clients 360, and serve the requests from clients 360. After receiving a request for a piece of content from clients 360, edge servers 340-348 may check if they already contain a cached version of the content. If not, edge servers 340-348 may retrieve the content from mid-tier servers 320 and 330, send the retrieved content to clients 360, and save a cached version of the content on edge servers 340-348.

Edge servers 340-350 may be proxies acting on behalf of origin server 310 via the functionalities of mid-tier servers 320 and 330. In such a proxy scenario, the requesting clients such as clients 360 may be unaware that they are communicating with a proxy and not the actual origin server. From the perspective of an end user, edge servers 340-350 may appear as a proxy since it retrieves content from origin server 310, acting on behalf of that origin server 310. In particular, clients 360 may request a URL that has a hostname which resolves to the proxy's IP address and, in compliance with, for example, the HTTP 1.1 specification, clients 360 may send a Host: header to the proxy that matches the hostname in the URL. The proxy may subsequently looks up this hostname in a list of mappings to find mid-tier servers 320 and 330 hostname; and if the hostname of the Host header is not found in the list, the proxy sends an error (404 Not Found) to clients 360. If the supplied hostname is found in this list of mappings, the proxy checks the cache, and when the content is not already present, connects to mid-tier servers 320 and 330 the requested Host:

maps to and requests the path of the original URL, providing the mid-tier servers 320 and 330 hostname in the Host header. The proxy then stores the URL in cache and serves the contents to clients 360. When there are subsequent requests for the same URL, edge servers 340-48 serve the content out of the cached version to reduce latency and network traffic.

Edge servers 340-350 may include a new edge server 350, which is newly installed in the CDN topology. Edge servers 340-48 may include sibling edge servers 340 and 342 as they share a common parent cache server mid-tier server 320 with new edge server 350, and all three servers (sibling edge servers 340, 342 and new edge server 350) connect to a common parent mid-tier server 320 in the caching hierarchy. Before new edge server 350 can be activated to accept live requests from clients 360, test tool 370 may connect to new edge server 350 for the purpose of conducting load test on new edge server 350. Likewise, test tool 370 may connect to one of the sibling servers (e.g. sibling edge server 340) and monitor the real time client requests on sibling edge server 340 and clone these requests to send to new edge server 350 to mimic a real load on new edge server 350. Notably, during the course of performing the load test, new edge server may only serve requests from test tool 370, while sibling edge servers 340 and 342 may serve requests in real time from clients 360. In such a configuration, any requested content is likely to be cached on common mid-tier server 320, test tool 370 may test new edge server 350 with real time load generated by clients 360 on sibling server 340 without unnecessary load to origin server 310 and minimize upstream impact. After a determination that the load test is satisfactory that new edge server 350 meets the performance and stability requirements, new edge server 350 may be disconnected from test tool 370, and activated to be an active edge to accept live requests from clients 360. Test tool 370 may be executed as a software process or implemented in hardware, such as a dedicated circuit or computer, on the same processor, as new edge server 350, or test tool 370 may be executed on a separate server as illustrated in FIG. 3.

Figure 4:
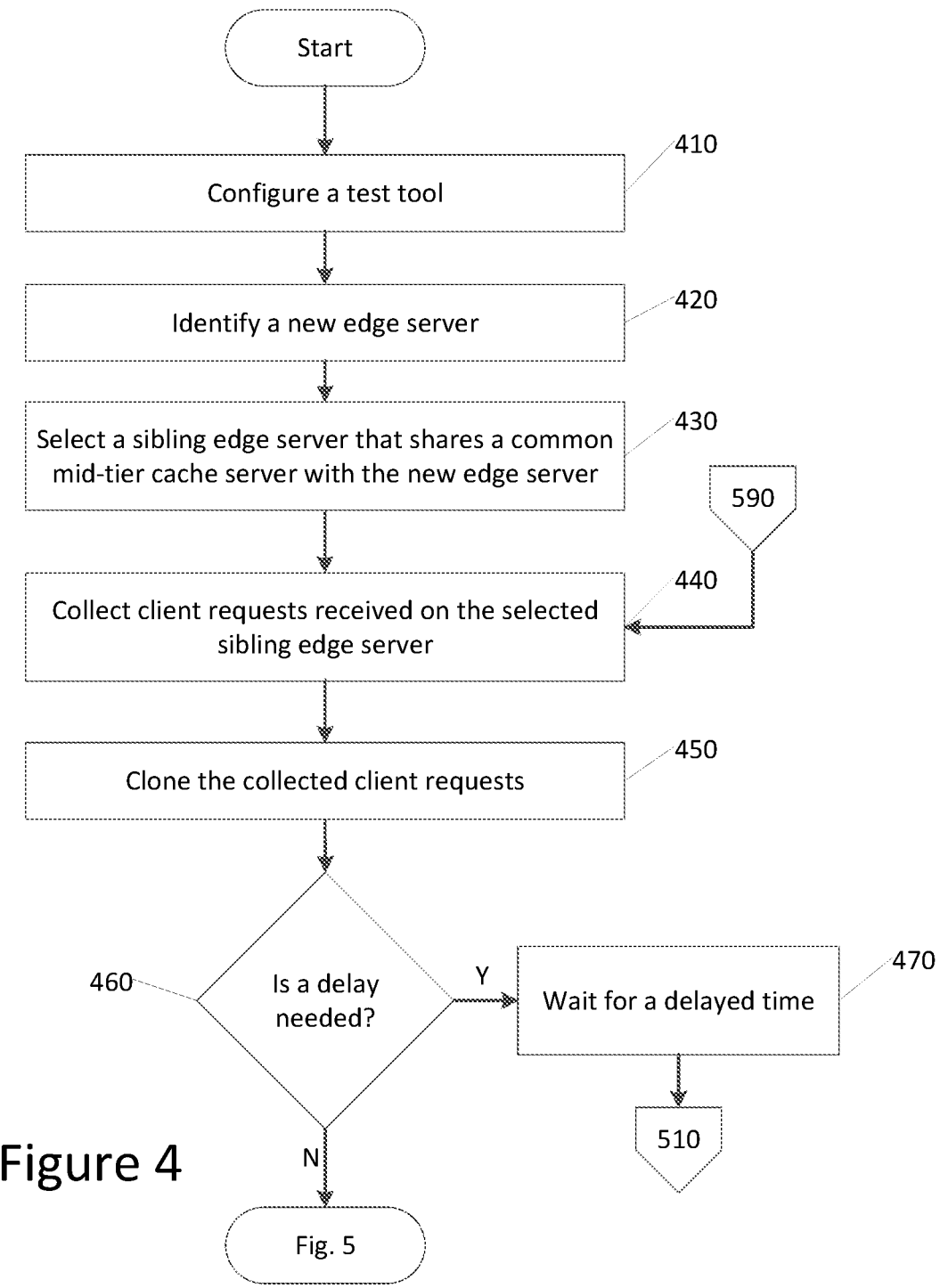
FIG. 4 illustrates an example flow process for edge testing without upstream impact in accordance with aspects disclosed herein.

FIG. 4 illustrates an example flow process for edge testing. Any step may be performed in any order, may be omitted, and/or may be modified in some embodiments. As illustrated in FIG. 4, at step 410, a test tool may be configured with parameters. For example, a test tool such as test tool 370 in FIG. 3 may be configured with configuration parameters associated with the new edge server, the CDN topology, and the load testing requirements.

The configuration parameters may indicate topological information of the new edge server, one or more mid-tier servers it connects to and the origin server that the mid-tier servers communicate with. Given that different content items may have different hierarchies, a server that is the origin for one piece of content may be an edge server for some other content. The configuration parameters may identify the various content (or content domains) that are serviced by the hierarchy, and can identify the server's location within the hierarchy for each content item. The configuration parameters may entail identifying an immediate parent for a particular content item or content domain, or they may identify server relationships for a portion of the CDN hierarchy (or even the entire hierarchy itself).

The configuration parameters may indicate parameters used in conducting load test on the new edge server. For example, a "—delay <init>" may indicate a delayed time that test tool 370 waits before sending the copied requests to the new edge server to ensure that the requests originated from clients 360 and forwarded by sibling edge server 340 have reached mid-tier server 320. Alternatively, a "—delay <init>" may indicate a delayed time that test tool 370 waits before sending the copied requests to the new edge server to ensure that the requests originated from clients 360 and forwarded by sibling edge server 340 have been processed by mid-tier server 320. Still alternatively, a "—delay <init>" may indicate a delayed time that test tool 370 applies before sending the copied requests to the new edge server to ensure that the requests originated from clients 360 and forwarded by sibling edge server 340 have been processed and the requested content has been cached on mid-tier server 320. As such, the delay parameter may be tuned to avoid the racing condition that a cloned request from new edge server 350 requesting a piece of content reaches mid-tier server 320 before a request from sibling edge server 340 is received at mid-tier server 320 asking for the same piece of content.

The delay parameter may be static, which may be a fixed value that minimizes the chances that new edge server 350 requests the content before it has been cached by mid-tier server 320. Alternatively, the delay parameter may be set dynamically, depending on the mechanism how the copied requests are collected. For example, if the copied requests are collected from the log file where it is written after the copied requests are cached at mid-tier server 320, a delay of zero may be used safely, given that mid-tier server 320 may be readily ready to serve a subsequent copied request. In another example, if the copied requests are collected either by monitoring the requests on the wire of sibling edge server 340 or monitoring a log file on sibling edge server 340 where the requests are logged at times when such requests begin to transmit from sibling edge server 340 to mid-tire server 320, it may be possible that a copied request from the new edge server 350 may hit mid-tier server 320 before mid-tier server 320 has finished responding to the real requester from sibling edge server 340. This may cause a situation referred to as a "thundering herd", where many requests for a given piece of content arrive while mid-tier server 320 is trying to get that content into its cache. The delay parameter may be set large enough to allow sufficient time for the mid-tier server 320 to complete its caching process, thus to avoid the thundering herd scenario.

For example, mid-tier server 320 may choose to send data to the requesting client (e.g. sibling edge server 340) first and write to its cache later. Alternatively, mid-tier server 320 may start returning data to the requesting client and writing to the cache concurrently. In either case, test tool 370 may receive information about the completed request before mid-tier server 320 finishes writing the object to the cache. This strategy may be useful if very large video objects (e.g. unfragmented multi-gigabyte data) are transferred and mid-tier server 320 may start re-streaming the objects to sibling edge server 340 while it is still loading the video objects from the source.

As such, in each of these cases, an operator may need to be aware of the strategies used by the caches on mid-tier server 320 and may choose a sufficient delay that meets a first criterion that the object is in the appropriate cache before new edge server 350 making the call. The operator may take consideration that large objects may take longer to hit the cache; or that certain kinds of requests may use particular strategies, and may tailor the delay to the individual request to minimize a cache miss and avoid hitting origin server 310, as described in details above.

Further, the delay may be short enough so that the requested content is unlikely to expire before new edge server 350 requests it. A cache miss may incur if the requested content expires in the cache, and it has to be requested from origin server 310. In practice, the delay may be set to be as short as possible but still for the delay to meet the first criterion.

The configuration parameters may indicate a "—mult <int>" parameter to multiply (e.g. amplify) the input to the output where a multiplier (e.g. amplification rate) of 1 (the default) makes one outgoing request for each incoming request. A multiplication may also be referred to as an amplification. Accordingly, for any one cloned request as input and a multiplier N, test tool 370 generates an output of N requests and send the multiplied (e.g. amplified) N requests to new edge server 350.

The configuration parameters may indicate a "—sample <int>" parameter to make one outgoing request for each "<int>" input requests. In this probabilistic fashion, test tool 370 produces the specified fraction of the input. Accordingly, for N cloned requests as input and a sample parameter of N, test tool 370 generates one output of outgoing requests for every N incoming requests and sends the sampled requests to new edge server 350.

The multiplication and sampling parameters may be selected based on intended test cases. For example, in a test case testing a new version of software of the cache to fix a memory leak on the connections, a relatively high multiplication parameter may be selected to amplify the requests to generate adequate hits to the system and increase the speed of the reply. In a test case to test a cache for a first time that may be buggy and may not be fully functional yet, the sampling rate may be tuned so that a few requests may go through to avoid the buggy data to overwhelm the system.

The configuration parameters may indicate a "—conn <int>" parameter to set the maximum simultaneous connections. To avoid system overload, this number may be configured below the available number of file handles provided on new edge server 350. This parameter may be further configured based on the requirements of a target load to be generated on new edge server in combination with the sampling process discussed in steps 540-560 of FIG. 5.

The target load is a desired testing criterion that the operator may choose, based on the testing goals. It may not always be the case to have the data blasting through. For example, there are cases that a realistic load may be sustained over an extended time period. Generally, in a realistic test, a cache that passes a 1:1 ratio of the target load and the realistic load in test may be likely to do well in production.

The configuration parameters may indicate a "—cps <int>" parameter to set the maximum number of connections per second. This parameter may be further configured based on the requirements of the load to be generated on new edge server in conducting the load test. For example, "—cps <int>" parameter may be set to have a low cap on the connection rate in a low-traffic scenario. The "—cps <int>" parameter may be set to a connection rate as the hardware and operating system allow in the testing environment and this parameter may be used in combination with the sampling and the multiplication parameters to control the load to the testing environment.

At step 420, the test tool may identify a new edge server. For example, test tool 370 may identify a new edge server 350 in FIG. 3. Test tool 370 may use the topology information associated with the new edge server 350 to identify the parent mid-tier server of new edge server 350. As new edge server 350 is not ready to serve requests from end users yet, test tool 370 may connect to new edge server 350 and no client 360 may be allowed to connect to new edge server 350 yet.

At step 430, the test tool may select a sibling edge server that shares a common parent mid-tier cache server with the new edge server. For example, test tool 370 in FIG. 3 may select sibling edge server 340 that shares a common parent mid-tier cache server (e.g. mid-tier server 320). Based on CDN topology information in the configuration information, test tool 370 may identify that edge servers 340 and 342 are siblings for new edge server 350, because all three edge servers share a common parent mid-tier server 320. Test tool 370 may randomly select any one of the siblings and choose to connect to sibling edge server 340 in the example of FIG. 3. Alternatively, based on CDN topology information such as a coverage zone map indicating what cache group is closest to new edge server 350, test tool 370 may determine that one of the siblings, such as sibling edge server 340, is closer in geographical proximity or network distance to new edge server 350 than sibling edge server 342 is, and thus choose to connect to sibling edge server 340. The network distance may be measured as a number of layer 3 network hops. Still alternatively, test tool 370 may use new edge server's location or geo coordinates to determine that sibling edge server 340 is in geographic proximity and select sibling edge server 340 to connect to. Still alternatively, based on the configuration information (e.g. "—conn <int>" or "—cps <int>" parameter), test tool 370 may determine that one of the siblings, such as sibling edge server 340, has a similar configuration to new edge server 350, and thus choose to connect to sibling edge server 340. Still alternatively, test tool 370 may determine that one of the siblings, such as sibling edge server 340, is more compatible in hardware with new edge server 350, and thus choose to connect to sibling edge server 340.

The test tool may determine that edge servers 340 and 350 have the same set of delivery services, for the cloned traffic to make sense to the new edge server 350. A delivery service may be referred to as remap rule that provides one to one mapping to a Fully Qualified Domain Name (FQDN) that is used as a hostname to deliver the content. For instance, delivery service settings may include the parameters such as Cache in RAM, cache on disk or do not cache at all; use DNS or HTTP content routing; limits on transactions per second and bandwidth; HTTP or HTTPS protocol; token based authentication settings and header rewrite rules. Test tool 370 may determine that edge servers 340 and 350 are more compatible with each other in term of these parameters and choose to connect to sibling edge server 340.

At step 440, the test tool may collect client requests received on the selected sibling edge server. For example, test tool 370 in FIG. 3 may collect client requests on selected sibling edge server 340. Test tool 370 may monitor client requests sent from clients 360 to sibling edge server 340, read a history or log files on sibling edge server 340 to identify client requests and collect corresponding entries in the log files. For instance, test tool 370 may collect the client request recorded in the log files one entry at a time, or read the relevant entries in batches. Alternatively, sibling edge server 340 may send the relevant entries associated with the client requests to test tool 370 periodically during the course of the load test running on new edge server 350.

At step 450, the test tool may clone (e.g. copy) the collected client requests. For example, test tool 370 may copy the client requests it read or received from selected sibling edge server 340. In some examples, cloning the collected client requests may be performed directly on sibling edge server 340. Alternatively, cloning the collected client requests may be performed on test tool 370 or a third party machine that is physically close to new edge server 350.

Test tool 370 may filter to select a subset of the client requests to clone. For example, test tool 370 may inspect a history of the collected client requests and determine a list of content associated with the collected client requests. Given that these client requests have transmitted to mid-tier server 320 via sibling edge server 340, mid-tier server 320 has cached a list of the requested content. Test tool 370 may determine an expiration schedule for the list of the cached content. Test tool 370 may obtain a list of cached content that has expired on mid-tier server 320 and in the event that new edge server 350 sends requests for these expired content, mid-tier server 320 has to generate upstream requests to origin server 310 to retrieve the content. To avoid upstream impact to origin server 310, test tool 370 may filter out client requests associated with the expired content based on the expiration schedule.

The expiration schedule may be set based on how long the video assets, for example, are held in the cache. The information about the expiration schedule may be passed along either as part of the log entries or in the control information out-of-band. For example, mid-tier server 320 may add an Age and a Max-Age header to the returned object (e.g. a requested video asset). Test tool 370 may look at those parameters as the object is returned to the requesting clients, add up the time that object has been in the cache, plus the time that the object has been waiting (due to delay or just the time to process the request) and choose not to issue the request to new edge server 350 if the copied request issued from new edge server 350 may cause a cache miss due to the parameter Age exceeding the parameter Max-Age. Alternatively, test tool 370 may drop any request that, at the time of cloning, has less than 10% of its cached lifetime remains.

At step 460, a determination is made whether a delay is needed. For example, test tool 370 may determine whether a delay is needed before sending the cloned client requests to new edge server 350. The determination may be based on configuration parameter "—delay <init>". To take advantage of the just-cached data at mid-tier server 320 and to prevent origin server 310 from overloaded by the load test, test tool 370 may introduce a timed delay to avoid the racing condition that the cloned requests arrive at mid-tier server 320 before the real time requests originated from sibling edge server 340. With the timed delay, the real time client requests from clients 360 via sibling edge server 340 would reach mid-tier server 320 and the requested content is cached on mid-tier server 320. Upon the cloned requests from new edge server 350 arriving at mid-tier server 320 to request the same piece of content, mid-tier server 320 serves a cached version of the content without any upstream impact to origin server 310. In some examples, due to the fact that test tool 370 needs time to read the client requests from sibling edge server 340 and generate the cloned client requests, which may generate adequate lagging in time to avoid the racing condition. As a result, it may be not necessary for test tool 370 to introduce a further delay before sending the cloned client requests to new edge server 350.

In case a delay is needed, the "—delay <init>" parameter may be tuned to ensure that the requests originated from clients 360 and forwarded by sibling edge server 340 have reached mid-tier server 320. Alternatively, the "—delay <init>" parameter may be tuned to ensure that the requests originated from clients 360 and forwarded by sibling edge server 340 have been processed by mid-tier server 320. Still alternatively, the "—delay <init>" parameter may be tuned to ensure that the requests originated from clients 360 and forwarded by sibling edge server 340 have been processed and the requested content has been cached on mid-tier server 320. Still alternatively, the "—delay <init>" parameter may be tuned to ensure that the requests originated from clients 360 and forwarded by sibling edge server 340 have been processed and a response has received on sibling edge server 340.

Figure 5:
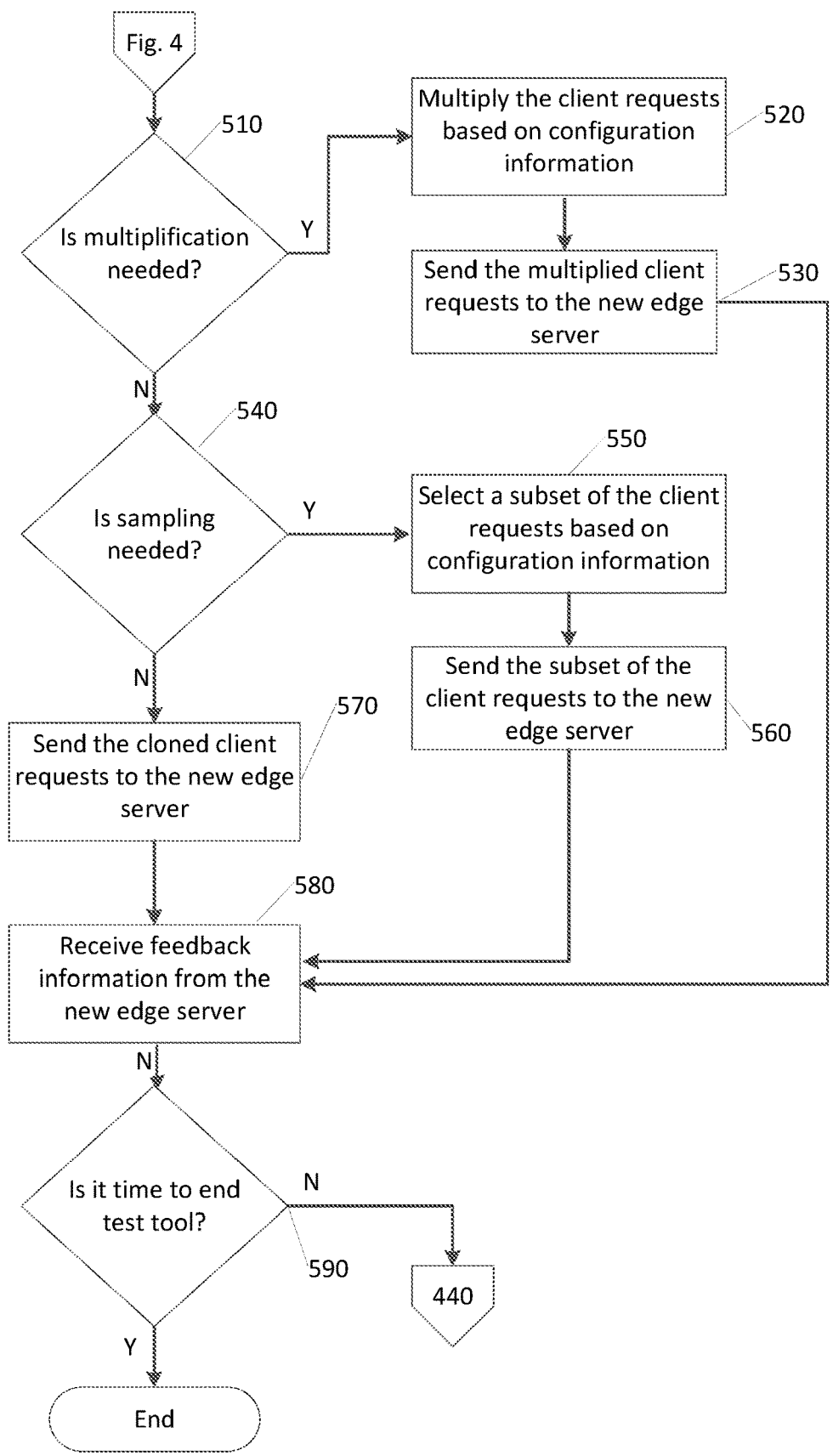
FIG. 5 illustrates another example flow process for edge testing without upstream impact in accordance with aspects disclosed herein.

If the answer to step 460 is yes, the test tool proceeds to step 470, and wait for a delayed time before it continues to step 510 in FIG. 5. If the answer to step 460 is no, the test tool proceeds to step 510.

At step 510, a determination is made whether a multiplication is needed. For example, test tool 370 may determine whether a multiplication is needed before sending the cloned client requests to new edge server 350. The determination may be based on configuration parameter "—mult <init>" indicating a ratio of the cloned client requests as an input to the clients requests to be sent to new edge server 350 as an output. Test tool 370 may use "—mult <int>" parameter to multiply the input to the output where a multiplier of N makes N outgoing requests for each incoming request. Multiplication affords the test tool a mechanism to amplify the traffic on the sibling server and generate excessive load on new edge server to fully test its stability and performance under stress.

If the answer to step 510 is yes, the test tool proceeds to step 520, and multiply the client requests based on configuration parameter "—mult <init>" before it continues to step 530 to send the multiplied client requests to the new edge server. If the answer to step 510 is no, the test tool proceeds to step 540.

At step 540, a determination is made whether a sampling is needed (e.g., to only copy a subset of the requests). For example, test tool 370 may determine whether a sampling is needed before sending the cloned client requests to new edge server 350. The determination may be based on configuration parameter "—sample <init>" indicating a probabilistic value that a subset of the input client requests are generated as output. For N cloned requests as an input and a sample parameter of N, test tool 370 generates one output of outgoing requests for every N incoming requests. Based on the probabilistic value, test tool 370 produces a specified fraction of the input. In some examples, test tool 370 may parse the input client requests and select a certain type of the client requests such as request for video content or Internet content to generate a subset as output in order to test the specific behavior of new edge server 350 and its capacity to handle specific type of traffic. Alternatively, the multiplication and sampling parameters may be used in combination to test the behavior of the new edge server handling specific type of traffic under stress.

Test tool 370 may determine a sampling rate based on the configuration parameter and sample the cloned client requests based on the sampling rate to generate a partition of the cloned client requests. Test tool 370 may determine the sampling rate based on a type of content associated with the cloned client requests. For example, test tool 370 may be interested on video traffic and determine a sampling rate based on the client requests associated with video content. Alternatively, test tool 370 may be interested on Internet traffic and determined the sampling rate based on client requests for internet content. Test tool 370 may determine the sampling rate based on a target load to be generated on new edge server 350.

If the answer to step 540 is yes, the test tool proceeds to step 550, and select a subset of the client requests based on configuration parameter "—sample <init>" before it continues to step 560 to send the subset of the client requests to the test edge server. If the answer to step 540 is no, the test tool proceeds to step 570 to send the cloned client requests to the test edge server.

Steps 530, 560 and 570 subsequently converge to step 580 where the test tool may receive feedback information from the new edge server. For example, upon completion of the load test on new edge server 350 with the cloned, multiplied or sampled client requests, test tool 370 may receive feedback information on the load test result from new edge server 350. Test tool 370 may parse the feedback information to find bottlenecks, identify errors, and measure performance of the new edge server. Test tool 370 may obtain the log files from sibling server 340 and compare it with the feedback information from new edge server 350. For the same set of content requested from sibling server 340 and new edge server 350, test tool 370 may analyze the URL, the scenario, the average response or transaction time and use the sibling edge server to gauge the performance of the new edge server.

At step 590, a determination is made whether it is time to end the test tool. If the answer is yes, test tool 370 is terminated; otherwise test tool 370 goes to step 440 in FIG. 4 to continue to collect client requests received on the sibling edge server.

The methods and features recited herein may be implemented through any number of computer readable media that are able to store computer readable instructions. Examples of computer readable media that may be used include RAM, ROM, Electrically Erasable Programmable Read-Only Memory (EEPROM), flash memory or other memory technology, CD-ROM, DVD, other optical disk storage, magnetic cassettes, magnetic tape, magnetic storage, and the like.

Additionally, or alternatively, in at least some embodiments, the methods and features recited herein may be implemented through one or more Integrated Circuits (ICs). An IC may be, for example, a microprocessor that accesses programming instructions or other data stored in a ROM. In some embodiments, a ROM may store program instructions that cause an IC to perform operations according to one or more of the methods described herein. In some embodiments, one or more of the methods described herein may be hardwired into an IC. For example, an IC may comprise an Application Specific Integrated Circuit (ASIC) having gates and/or other logic dedicated to the calculations and other operations described herein. In still other embodiments, an IC may perform some operations based on execution of programming instructions read from ROM or RAM, with other operations hardwired into gates or other logic. Further, an IC may be configured to output image data to a display buffer.

Although specific examples of carrying out the disclosure have been described, those skilled in the art will appreciate that there are numerous variations and permutations of the above-described apparatuses and methods that are contained within the spirit and scope of the disclosure as set forth in the appended claims. Additionally, numerous other embodiments, modifications, and variations within the scope and spirit of the appended claims may occur to persons of ordinary skill in the art from a review of this disclosure. Specifically, one or more of the features described herein may be combined with any or all of the other features described herein.

The various features described above are merely non-limiting examples and may be rearranged, combined, subdivided, omitted, and/or altered in any desired manner. For example, features of the servers may be subdivided among multiple processors and/or computing devices. The true scope of this patent should only be defined by the claims that follow.

The invention claimed is:

1. A method comprising:
   receiving, by a computing device in a content delivery network comprising a hierarchy of servers, a content request for a content item;
   selecting, by the computing device, a plurality of sibling servers in the hierarchy of servers, wherein the computing device and the plurality of sibling servers connect to a common parent server;
   waiting, after receiving the content request, an amount of delay time that is based on the content item being associated with a prior request received by a sibling server of the plurality of sibling servers; and
   after waiting the amount of delay time, sending a request for the content item.

2. The method of claim 1, wherein the amount of delay time is further based on an expiration schedule of the content item.

3. The method of claim 1, wherein the amount of delay time is further based on a type of the content item.

4. The method of claim 1, wherein sending the request for the content item further comprises sending a plurality of requests for the content item.

5. The method of claim 1, further comprising:
   selecting requests based on a traffic type of content items associated with a plurality of requests received by the sibling server; and
   sending based on the selected requests, requests for content items associated with the selected requests.

6. The method of claim 1, further comprising:
   after sending the request for the content item, sending a new request for the content item without waiting the amount of delay time.

7. The method of claim 1, further comprising:
   adjusting an amount of delay time for a new request based on a response to the request for the content item.

8. The method of claim 1, wherein the amount of delay time is further based on a determination that a quantity of requests sent upstream from the common parent server satisfies a threshold value.

9. The method of claim 1, wherein the amount of delay time is further based on a determination that the sibling server received the prior request for the content item within a threshold amount of time.

10. A method comprising:
    receiving, by a first server in a content delivery network comprising a hierarchy of servers, a content request for a content item, wherein the hierarchy of servers comprise a plurality of sibling servers each sharing a common parent with the first server;
    receiving, by the first server, an instruction to wait for an amount of delay time after the content request; and
    after waiting the amount of delay time, sending, to the common parent, a request for the content item.

11. The method of claim 10, wherein the amount of delay time is based on the content item being associated with a prior request received by a sibling server of the plurality of sibling servers.

12. The method of claim 10, wherein the amount of delay time is based on a sibling server, of the plurality of sibling servers, receiving a prior request for the content item within a threshold amount of time.

13. The method of claim 10, wherein the amount of delay time is based on an expiration schedule of the content item.

14. The method of claim 10, wherein the amount of delay time is based on a determination that a quantity of requests sent upstream from the common parent satisfies a threshold value.

15. The method of claim 10, further comprising:
after waiting the amount of delay time, receiving, by the first server, a new content request for the content item; and
receiving, by the first server, a new instruction to send, to the common parent, a new request for the content item without delay.

16. A method comprising:
determining a plurality of sibling servers in a content delivery network comprising a hierarchy of servers, wherein the plurality of sibling servers connect to a common parent in the hierarchy;
configuring a first server to share the common parent with the plurality of sibling servers in the content delivery network; and
configuring the first server to delay sending, to the common parent, a request for a content item after receiving a content request for the content item.

17. The method of claim 16, wherein configuring the first server to delay sending comprises sending an instruction to check a status of the plurality of sibling servers before sending the request for the content item.

18. The method of claim 16, wherein configuring the first server to delay sending further comprises:
configuring the first server to delay sending based on a determination that one of the plurality of sibling servers received a prior request for the content item within a threshold amount of time.

19. The method of claim 16, wherein an amount of delay time is based on an expiration schedule of the content item.

20. The method of claim 16, wherein an amount of delay time is based on a type the content item.

* * * * *

UNITED STATES PATENT AND TRADEMARK OFFICE
CERTIFICATE OF CORRECTION

| | | |
|---|---|---|
| PATENT NO. | : 11,848,845 B2 | Page 1 of 1 |
| APPLICATION NO. | : 17/734783 | |
| DATED | : December 19, 2023 | |
| INVENTOR(S) | : Chris Lemmons | |

It is certified that error appears in the above-identified patent and that said Letters Patent is hereby corrected as shown below:

In the Specification

Column 8, Line 31:
Delete "mid-tire" and insert --mid-tier--

Signed and Sealed this
Seventh Day of January, 2025

Derrick Brent
*Acting Director of the United States Patent and Trademark Office*